(No Model.)  6 Sheets—Sheet 1.
F. O. BLACKWELL.
ELECTRIC RAILWAY.
No. 452,160. Patented May 12, 1891.
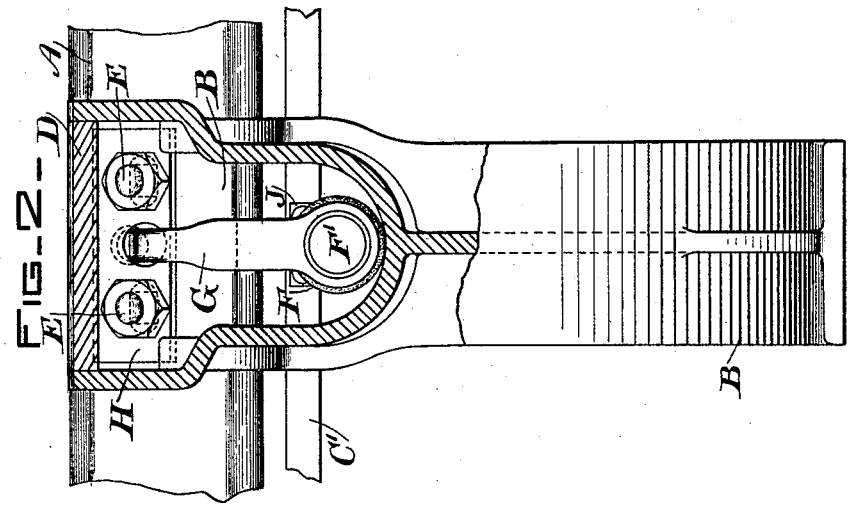
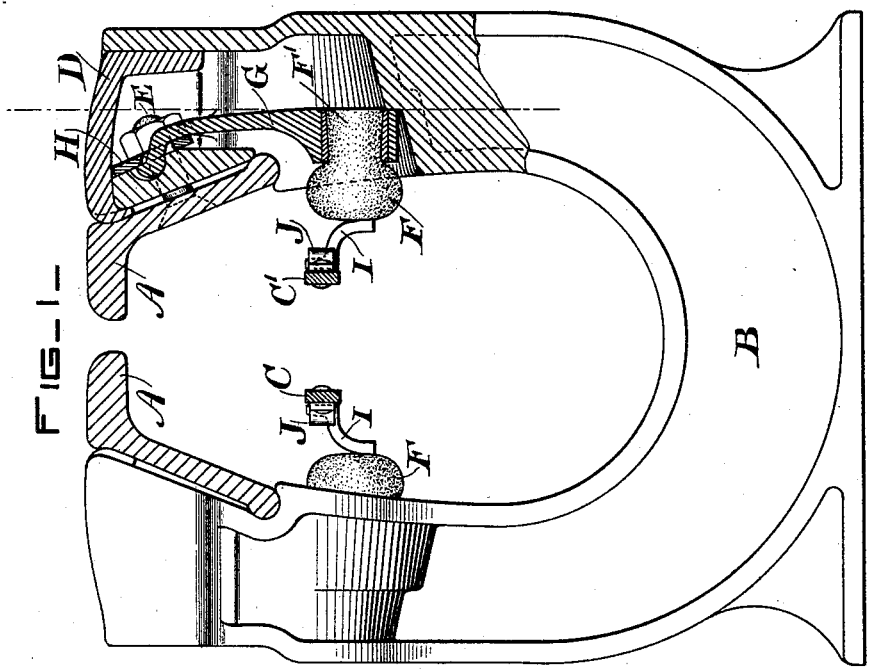
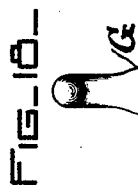
WITNESSES:
INVENTOR:
Francis O. Blackwell
by Bentley & Knight
ATTYS.

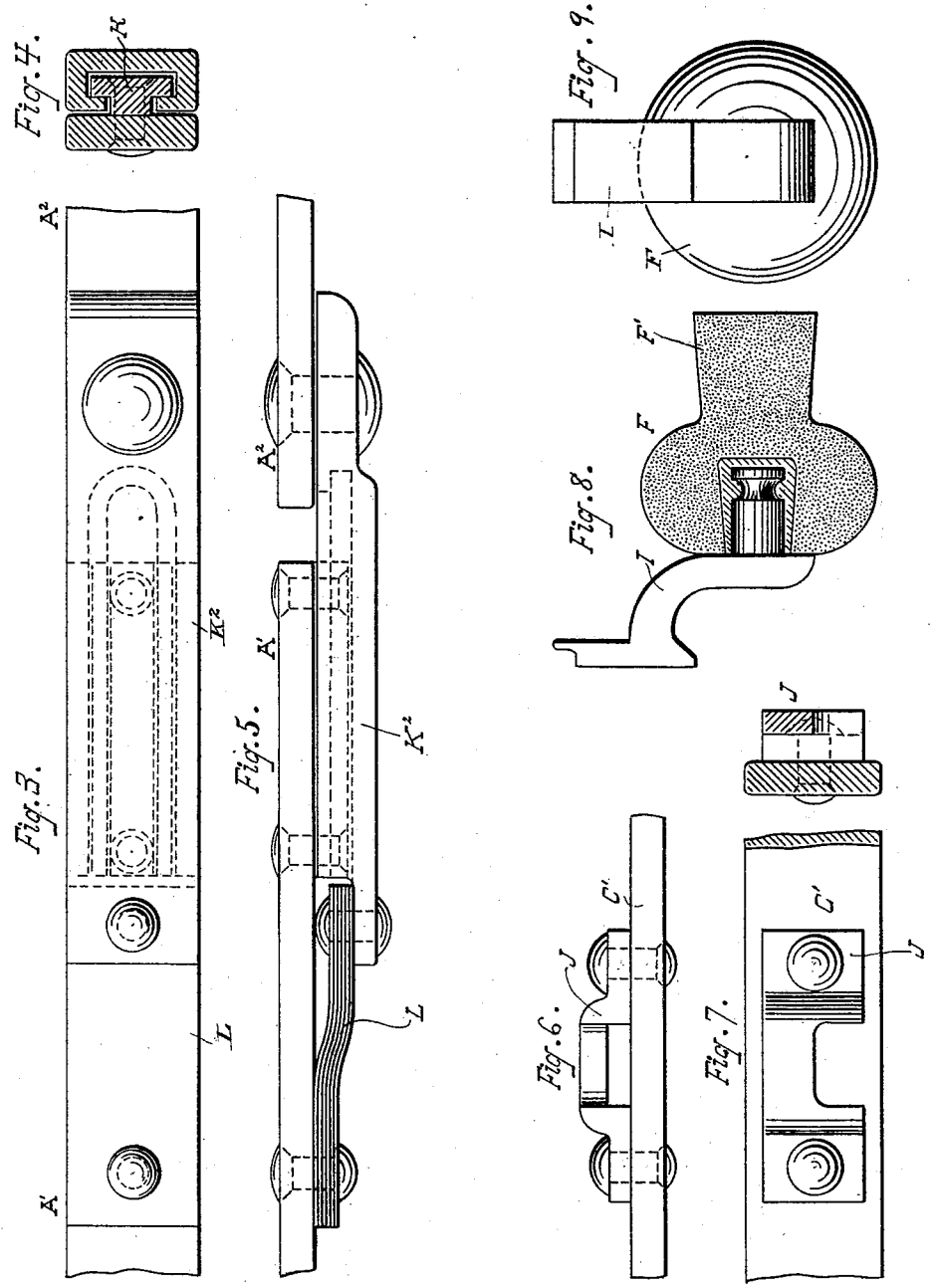

(No Model.) 6 Sheets—Sheet 3.
F. O. BLACKWELL.
ELECTRIC RAILWAY.
No. 452,160. Patented May 12, 1891.
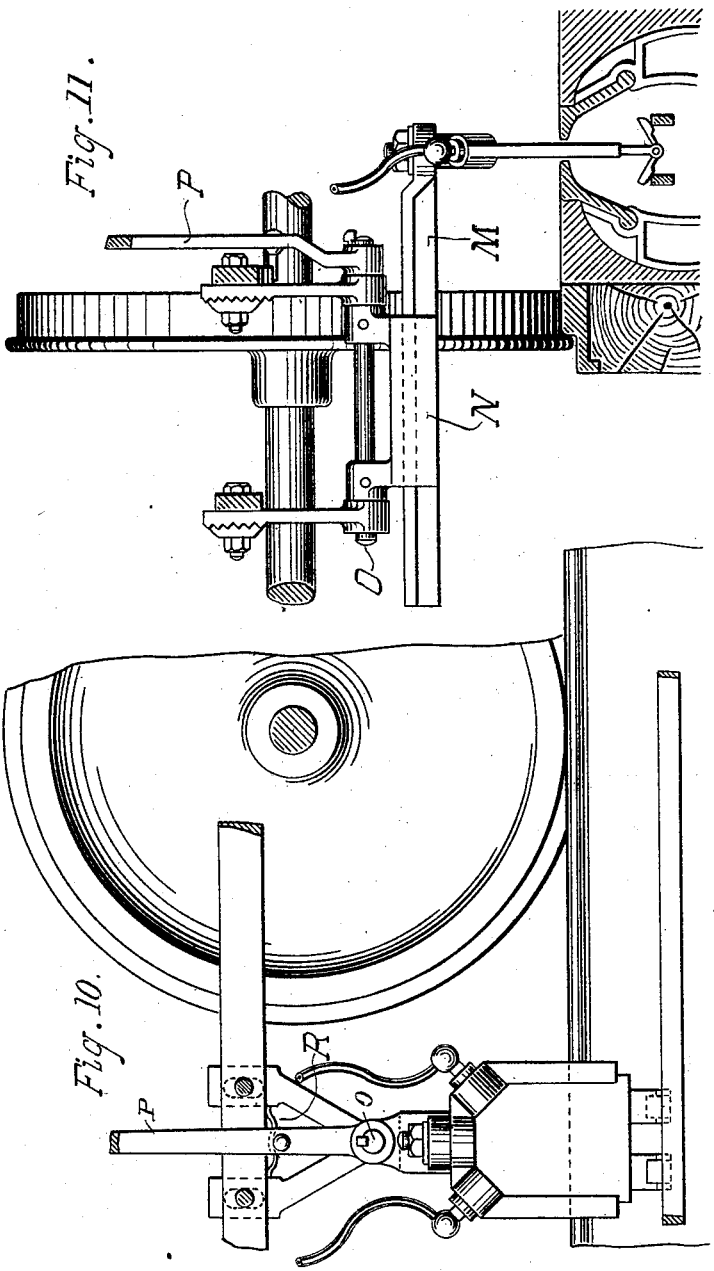
WITNESSES
Edward S. McKinney
Julian M. Elliot
INVENTOR
Francis O. Blackwell
by Bentley & Knight
Attys (No Model.)  6 Sheets—Sheet 4.
F. O. BLACKWELL.
ELECTRIC RAILWAY.
No. 452,160.  Patented May 12, 1891.
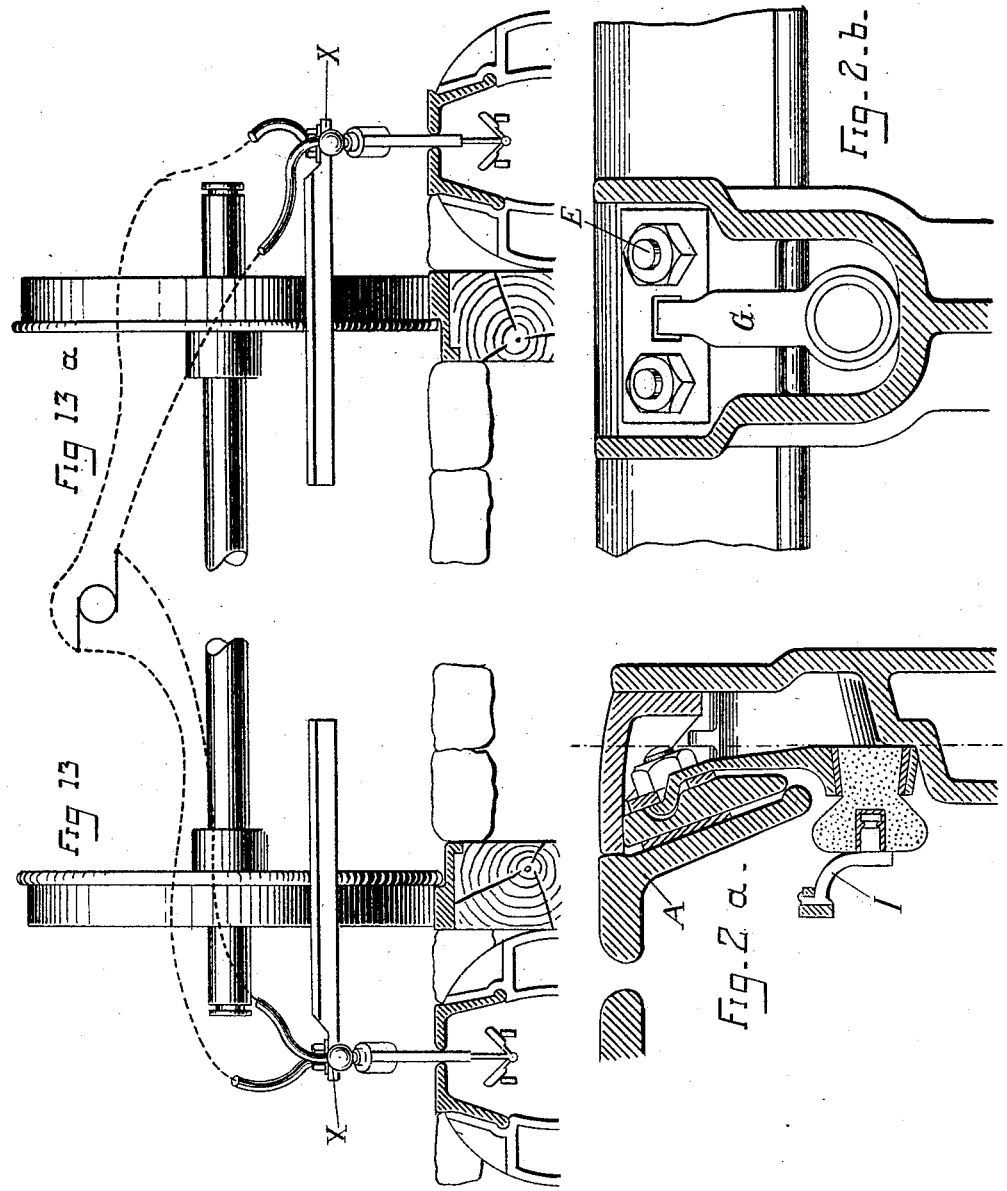
Witnesses
Joseph E. Ave
S. M. Cauldwell
Inventor
Francis O. Blackwell
by Brittey & Knight
Attys.

(No Model.)  6 Sheets—Sheet 5.
F. O. BLACKWELL.
ELECTRIC RAILWAY.
No. 452,160. Patented May 12, 1891.
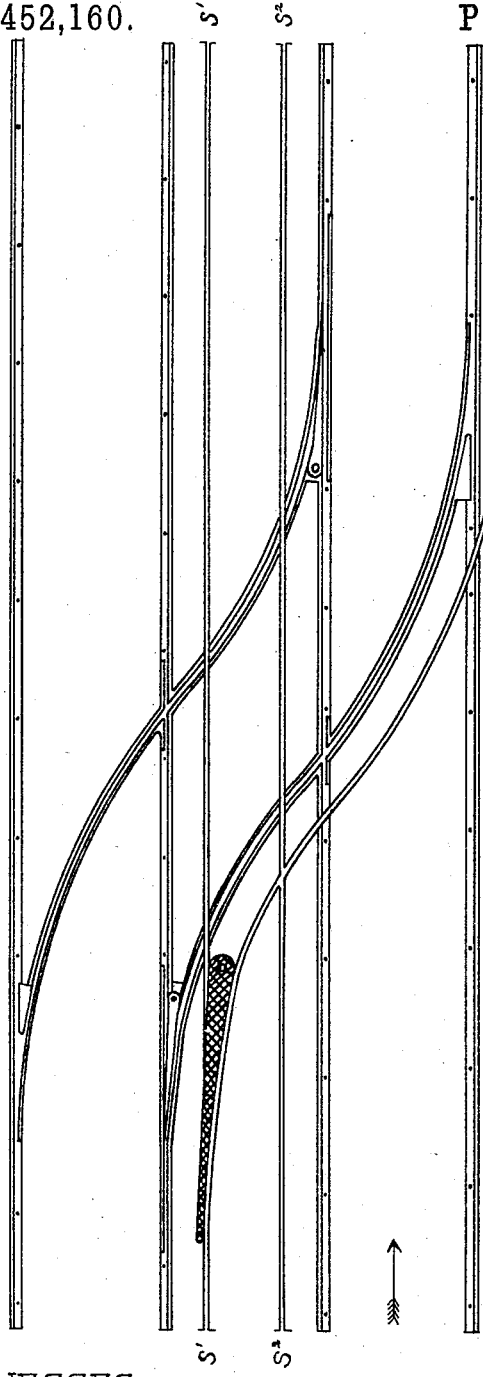
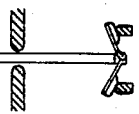
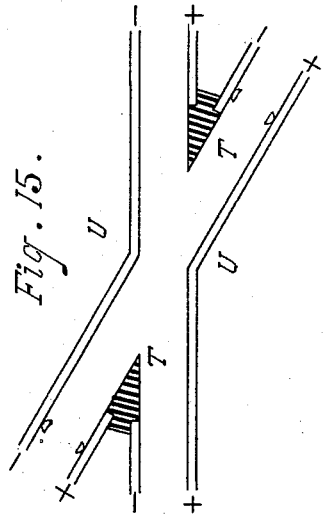
WITNESSES
James H. Bates.
Edward S. McKinney.
INVENTOR
Francis O. Blackwell
by Bentley & Knight
Attys

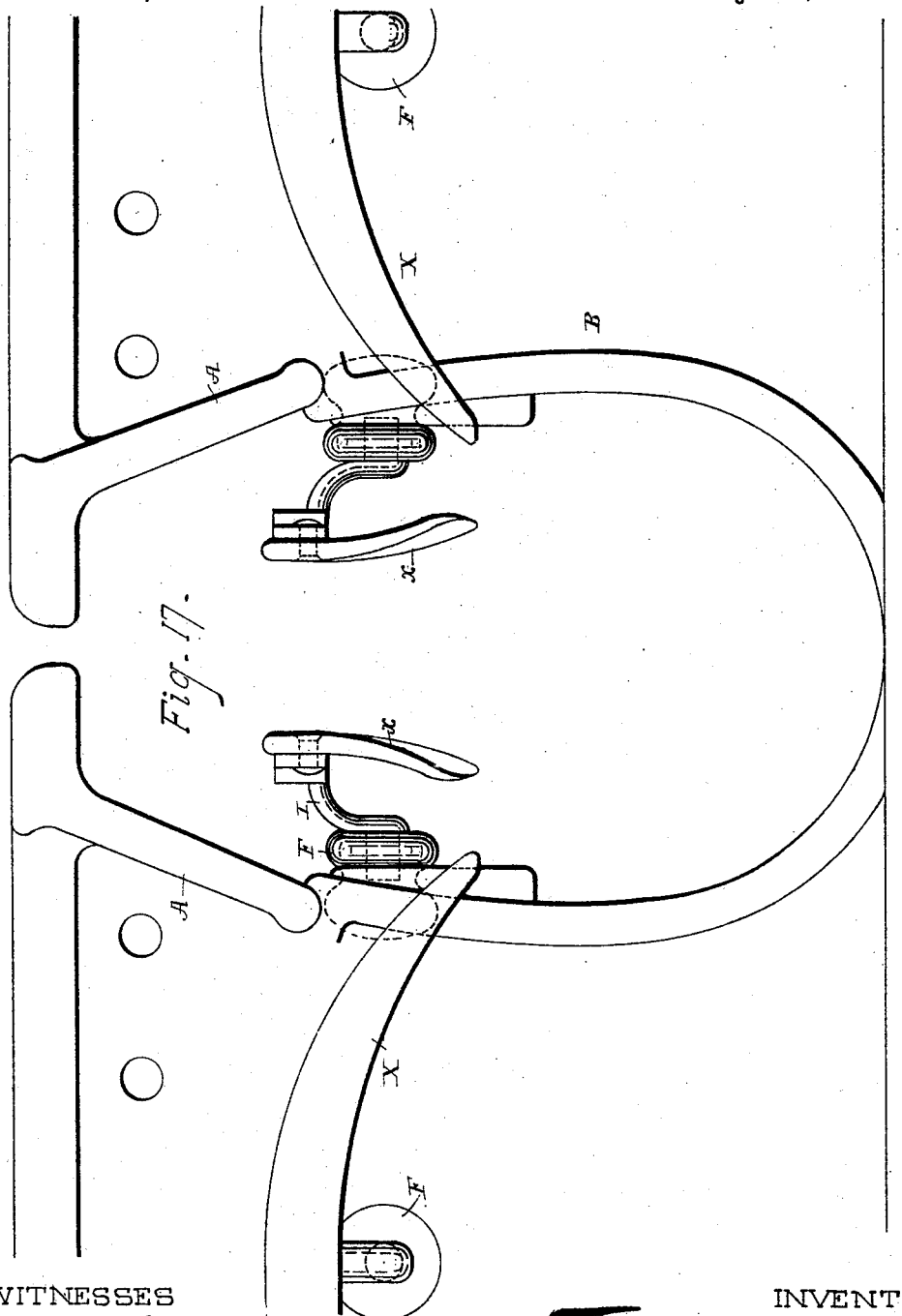

UNITED STATES PATENT OFFICE.

FRANCIS O. BLACKWELL, OF NEW YORK, N. Y., ASSIGNOR TO THE THOMSON-HOUSTON ELECTRIC COMPANY, OF CONNECTICUT.

ELECTRIC RAILWAY.

SPECIFICATION forming part of Letters Patent No. 452,160, dated May 12, 1891.

Application filed November 23, 1888. Serial No. 291,647. (No model.)

*To all whom it may concern:*

Be it known that I, FRANCIS O. BLACKWELL, a citizen of the United States, residing at New York, in the county of New York, State of New York, have invented certain new and useful Improvements in Electric Railways, of which the following is a specification.

My invention relates to electric railways in which the supply-conductor is inclosed in a slotted conduit beneath the surface of the roadway; and it consists in certain features of construction of the conduit and conductor and in the contact device adapted to extend from the electrically-propelled vehicle into the conduit to connect with the supply-conductor therein.

First. I have devised a form of conduit having the yoke provided with a pocket or opening accessible from the surface of the street, in which is contained the support for the main conductor and which permits ready access to the insulators without removing or interfering with any of the fixed parts of the conduit.

Second. I have devised a support or hanger which supports the conductor in the conduit and which allows it to have a free swinging motion therein. This hanger preferably extends up into the recess in the yoke and is so journaled as to permit longitudinal but not lateral movement. If desired, it may be held in place by the same fastening device which secures the slot-rail to the yoke.

Third. I have provided an insulator which is attached to the conductor and movably connected with its support, thereby making provision for expansion and contraction. This insulator is preferably embedded in an opening at the lower end of the swinging hanger and carries a bracket adapted to engage freely with a loop on the back of the conductor.

Fourth. I pivot the sections of conductor together, thereby permitting slight relative movement, and I have provided an expansion-joint, which may be connected to one section of the conductor in the shop, so that when the conductor is laid it is only necessary to connect adjacent sections through this joint, and complete electrical and mechanical union is secured.

Fifth. Whenever in equipping a double-track road the conductors are laid outside the axes of the two lines of track, it is evident that the current-collector will not occupy the same position relative to the conductors when the car is on the two lines. It is therefore necessary to provide either a single attachment of the collector to the vehicle, movable from side to side of the car, or two separate attachments, which correspond in their positions upon the vehicle to the positions which the conductors hold relative to their respective tracks. I have provided herein two separate attachments, to each of which the current-collector corresponding to a particular track will be connected when the car is on said track. It is evident that the result may be accomplished by providing two contact devices, which are connected permanently or alternately to the two attachments, respectively, or by providing a single collector, which can be transferred from one to the other. As no means for meeting this exigency have been previously devised, my invention is intended to include all these various modifications.

Sixth. I have provided a plow or current-collector having a contact-surface bearing upon the upper edge of the conductor, but free to move to a point below its normal line of contact therewith, and I have provided at crossings and switches a mold-board, preferably of non-conducting material forming an extension of the conductor-section and adapted to guide the contact onto the end of the conductor.

Seventh. My invention also comprises other features of construction, as related in the claims forming part of this specification, and the said claims are intended to cover not only the specific devices herein disclosed, but all modifications and equivalent constructions accomplishing the same desired results.

My invention is illustrated in the accompanying drawings, wherein—

Figure 1 is a transverse section of the conduit, showing the form of yoke and the construction of the insulator and conductor supports. Fig. 2 is a side elevation of the same. Figs. 2<sup>A</sup> and 2<sup>B</sup> are detail views showing the swinging insulator-hanger. Figs. 3, 4, 5, 6, 7, 8, and 9 show in detail the conductor-joint, the insulator, and the attachment to the conductor. Figs. 10 and 11 are respectively side and end elevations of a contact device at the side of the vehicle extending into a conduit outside the track. Fig. 12 is a detail showing a section of the plow-guide. Figs. 13 and 13$^A$ show the two plows upon opposite sides of a vehicle, which are designed to be used alternately, according as the vehicle is upon the one or the other of the tracks of a double-track road, and the electrical connections between the plows and motor are herein represented in dotted lines. Fig. 14 is a plan of a cross-over between two tracks of a railway having two conduits. Fig. 15 is a plan of the conductors at the switch-point. Fig. 16 is a detail showing the manner in which the contact-shoes bear upon the conductors. Fig. 17 shows a crossing, with the mold-boards forming extensions on the ends of the supply-conductors; and Fig. 18 is a detail view of the insulator-hanger, showing particularly the pivot on which it swings.

Referring to Fig. 1, A A are respectively the two slot-rails of a conduit, which are supported a fixed distance apart by transverse yokes B, placed at intervals, the space between the yokes being filled up with iron, concrete, or other suitable material to form the lower part of the conduit. C and C' are the two supply-conductors. The yoke B is formed with a hollow pocket or opening extending up outside the slot-rail to the surface of the roadway and provided with a cap or cover D. The slot-rail is bolted to the yoke by two bolts E, extending from the inside of the conduit into the opening in the yoke and there secured by nuts. The holes in the yoke, through which the bolts E pass, are slotted, as shown in Fig. 2. Provision is therefore made for independent expansion and contraction of the slot-rails and the conductor. F is an insulator, of wood or porcelain or other suitable material, having a shank F' embraced by a ring on the lower end of a support or hanger G and sealed therein by lead, sulphur, or other similar deadening material $t$. This intermediate filling renders possible the use of porcelain or similar frangible insulators without danger of their being broken, for it deadens the shocks arising from the traffic of the street and which are transmitted through the metal of the conduit to the insulators, and also the strains due to expansion and contraction. The upper end of hanger G is provided with an offset extending into a recess in a washer H under the nuts on bolts E. The hanger G is supported somewhat loosely at its upper end, and at its lower end is free to move slightly from side to side to take up any expansion or contraction of the conductor or any inequalities in the construction. In the outer end of insulator F is sealed with a filling of deadening material $t^2$ a curved bracket I, as shown in Figs. 8 and 9, an extension on the outer end of the bracket being adapted to engage with the loop J on the back of the conductor. The hanger G brings the point of attachment of the conductor to the conduit well up toward the top of the pocket in the yoke and makes it possible to use the same bolts to secure both the conductor and the slot-rails in place. These bolts are in a position readily accessible from the street surface. The hanger allows the conductor a limited longitudinal movement to compensate for contraction and expansion; but lateral motion is avoided in this device, as it is desirable to maintain the distance between the two conductors practically uniform. The insulator F is supported by the hanger at the side of the conduit below the slot-rail, with its forward end projecting into the line of the conduit and its rear end into the pocket in the yoke. The insulator is thereby protected by the overhanging portion of the slot-rail and may be readily inspected, while the bracket extending upwardly and outwardly therefrom supports the conductor in the upper part of the conduit and brings it out nearer the line of the slot. In some other devices which have been devised the insulator has been fixed to the conduit and allowance made for expansion by providing a sliding or movable connection between the conductor and the insulator; but in my invention all such connections may be avoided. The hanger, insulator, and bracket may be put together in the shop, and the support thus formed is connected to the conductor and conduit and swings backward and forward in accordance with the movement of the conductor. The conductor is provided with fixed lugs upon its rear side, with which the brackets engage freely, and if any of the insulators become broken the defect may be remedied by simply removing the hanger from the conduit, slipping the bracket out of engagement with the conductor, removing the whole support through the opening in the yoke, and by putting a new one in place in a similar manner, none of the conduit structure need be displaced and no fitting or adjusting need be done outside of the shop.

In Figs. 3, 4, and 5 I have shown my conductor-joint. A' A$^2$ are the adjacent ends of two conductor-sections. One of these, as A', is provided behind with a dovetail K riveted to it. A sleeve K$^2$ is fitted loosely over the dovetail and connected at one end with conductor A' by a flexible connection L, the said connection being permanently riveted both to A' and K$^2$. The flexible connection L is composed of a number of superposed metallic strips forming a stiff spring. It holds the sleeve in line with conductor A', so that the expansion-joint may work easily, while it at the same time permits the necessary relative movement between the sections A' and A$^2$ and maintains the electrical connection independently of a dovetail K. The construction of the joint, as far as described, is all made at the shops before the conductors are taken to the ground to be laid. The free end of K² has one large hole, and a similar hole is made in A². When putting a section in place, a rivet is put through these two holes and permanently fastened. This arrangement permits of the minimum amount of work being done on a street, and at the same time the rivet between K² and A² permits of a slight bending of the conductor up or down, by which it is adjusted to the irregularities of the conduit. This latter function applies to any sliding connection of this character, whether used as a simple support or as a connection between two adjacent sections. This rivet, acting as a pivot between the conductor-sections, is preferably placed adjacent to the sliding sleeve, whereby any binding between the sleeve and the dovetail is prevented.

In Figs. 10 and 11 I have shown a contact device or plow adapted to a conduit such as described, placed outside of the track. In this construction the plow itself is of any well-known type, especially that in which the contact-shoes bear upon the upper side of the conductors in the conduit. At its upper end the plow has a swivel attachment to a transverse bar M, adapted to slide in a guide N. The guide N is supported from a parallel rod O, which is rigidly attached to the guide, but is free to turn in bearings, so as to give both the guide and the plow a movement about a transverse axis. It is normally held in a vertical position by the lever-arm P, attached firmly to O and held by a spring-catch R. When an obstruction is encountered in a conduit, or when it is desired to lift the plow out, the arm P is forced over until it leaves the spring-catch, and the plow is thus turned up out of the conduit.

Fig. 14 shows a plan of a double-track road, a cross-over section, and suitable switches, and in this view S' S² represent the conduits for the two tracks, respectively, in which are inclosed the supply-conductors. Suppose, now, a car to come in the direction of the arrow, with its plow in the conduit S² and to be transferred to the opposite track. The car has not been reversed, but the position of the conductor has changed its sides relatively thereto, and it is apparent that the plow used in conduit S² is not adapted to engage with the conductor in S'. Whenever, therefore, the conductors for different sections of track change their positions relative to the respective sections, some corresponding change must be made in the current-collectors or in the points of attachment of the collectors to the car, and means for meeting this exigency constitute an important part of my invention. In Fig. 14 the conduits are placed between the two tracks and at the cross-over S' is provided with a branch running parallel to the cross-over track and along the opposite main track to a point beyond the cross-over-track switch. In Fig. 13 is shown a car having two oppositely-placed collector attachments X X', corresponding to the two tracks, respectively, one upon each side of the car. To these attachments there are connected, either permanently or alternately, current-collectors adapted for use upon the two tracks, respectively. In Fig. 13 I have shown a duplicate set of plows of the construction before described. Each of these plows is provided with a bolt at its upper end, by which it is secured to the collector attachment, and each plow may be turned up independently of the other. In this specific arrangement the plows are permanently connected to the car, and the manner of using them is as follows: When the car is moving in the direction of the arrow on the right-hand track, the left-hand plow will be the active one; but when the car has passed beyond the cross-over switch it will be stopped, the plow will be turned up, and the right-hand plow will be dropped into the branch of conduit S', becoming the active plow for the return trip. As the plows are adapted to be dropped into the conduit at any point, the change occupies but a moment, while the construction of guide allows of the minimum projection beyond the wheels of the car, since all the necessary lateral play will be given by the guide N beneath the car. It will, however, be understood that these plows can readily be removed from the car, and the same or different collectors coupled alternately to the two attachments, as circumstances require.

Fig. 14 shows that the two conduits occupy the same relative positions with reference to their respective tracks, and the collector attachments in Fig. 13 are correspondingly located at equal distances from the sides of the car. By this arrangement the vehicle is enabled to travel upon both lines of track, whether it is reversed at the end of the line or not.

In Fig. 15 is shown a plan of the conductors in the conduit where the branch of S' crosses the main conduit S². The inside conductors upon opposite sides of the angle are provided with insulated extensions T, which are bent downward at the points, so that the contact-shoes riding upon the top of the conductor, as shown in Fig. 16, will pass over the break without being caught. The continuous conductors will also be beveled off at the hangers U, or they may be interrupted, as shown in Fig. 17. In each case the contact-shoes will pass over the break onto the succeeding section of conductor without difficulty, the plows being duplicated where necessary, in order to avoid an interruption of the connection.

In Fig. 17 the ends of the conductor-sections are shown in detail as being provided with downwardly-curved extensions for the purposes just described. This construction will also be of service where two conduits belonging to the same or different systems cross each other at right angles. The contact-shoes stand normally at an angle to the plow and have a limited downward movement. The extensions of the conductor are curved so that their outer ends are on a lower plane than the shoes when at the limit of their movement, so that the shoes engage with the upper edge of the extensions and are forced upward against the spring to their normal line of contact with the conductors.

What I claim as new, and desire to secure by Letters Patent, is—

1. In an electric-railway conduit, the combination, with a slot-rail and a supporting-yoke, of an opening in the yoke and an insulator-hanger therein, pivotally supported at a point above the insulator to permit a movement of the insulator with the conductor.

2. In an electric-railway conduit, the combination, with an inclosed conductor, of a swinging support therefor.

3. In an electric-railway conduit, the combination, with an inclosed conductor, of a swinging support therefor, pivotally supported at a point above the conductor.

4. In an electric-railway conduit, the combination of an inclosed conductor and swinging supports therefor, capable of movement on a transverse axis.

5. In an electric railway, the combination of a conduit, a conductor, and swinging supports between the conduit and conductor, journaled upon transverse pivots, permitting vertical but not lateral movement of the conductor.

6. In an electric-railway conduit, the combination of an inclosed conductor and a yielding support therefor, secured to the conduit and conductor and permitting a free longitudinal movement of the latter.

7. In an electric-railway conduit, the combination of a conductor with yielding supporting-hangers, allowing the conductor a swinging parallel link movement in the conduit.

8. A conductor for an electric railway, composed of sections of substantially rigid material pivoted together, in combination with yielding supporting-hangers for the same.

9. The combination, with a slot-rail, of the transverse yoke having a pocket or opening therein accessible from the street, and a conductor-support therein projecting into the conduit and removable through said opening.

10. The combination, in an electric railway, of a conduit consisting of transverse yokes and slot-rails, with an opening into the conduit below the slot-rail, and a conductor-support projecting through said opening and having an upwardly-extending connection-piece supporting the supply-conductor in the upper part of the conduit.

11. The combination of the conduit consisting of transverse yokes and slot-rails supported thereon, pockets in the yokes accessible from the street opening into the conduit below the slot-rail, a conductor-support secured within and removable through said pocket, and a conductor within the conduit carried by said support.

12. The combination, in an electric railway, of a substructure forming the lower part of the conduit, and the slot-rails with a pocket behind the slot-rail opening into the conduit, an inclosed supply-conductor, and a conductor-support removable through said pocket.

13. The combination of the conduit, the inclosed supply-conductor, and support therefor, engaging said conductor by a slip-joint, whereby it can be disconnected readily from the conductor at will, with a pocket opening into the conduit, through which the support is removable.

14. In an electric-railway conduit, the combination, with a slot-rail, of a supporting-yoke therefor, having a recess outside the conduit, a conductor-support extending into the said recess, and a bolt for attaching the slot-rail to the yoke, having one end terminating in the said recess.

15. In an electric-railway conduit, the combination, with a yoke, with which the slot-rail has a movable connection, permitting expansion and contraction, of a supply-conductor inclosed in the conduit, a porcelain or similar insulator therefor, connecting the conductor with the conduit, while permitting the conductor a longitudinal movement relative to the conduit independent of the movement of the slot-rail.

16. In a conduit for electric railroads, the combination of the yoke, the slot-rail, and the conductor-support with the fastening device securing both the rail and support to the yoke.

17. In a conduit for electric railways, the combination of a transverse yoke having a box or pocket at its upper end, a slot-rail, and a conductor-support, with fastening devices securing both rail and support to the yoke and located in the said pocket.

18. In an electric-railway conduit, the combination, with an inclosed supply-conductor, of a porcelain or similar vitreous frangible insulator connected with the supply-conductor and supporting and insulating the same, and a metallic supporting-piece attached to the insulator by an intermediate filling of deadening material, as set forth.

19. In an electric-railway conduit, the combination, with an inclosed supply-conductor, of a porcelain or similar vitreous frangible insulator, a metallic shank connected to the conductor, embedded in the insulator, with an intermediate filling of deadening material, and a metallic holder embracing the insulator, the whole forming an insulator-hanger by which the conductor is supported and insulated from the conduit, as set forth.

20. In an electric-railway conduit, the combination of a porcelain or similar vitreous insulator enlarged at its front end and having a contracted shank F' at its rear end, with a metallic holder attached to the conduit and embracing the shank of the insulator, and a bracket I, connected to the conductor and embedded in the enlarged front end of the insulator.

21. The combination, in an electric railway, of a conduit provided with pockets for the insulator-hangers, with an insulated conductor and hangers supporting the same, consisting of a porcelain or similar vitreous insulator, and a metallic holder attached to the insulator at one end and extending up in the pocket, where it is secured to the conduit at its upper end, as set forth.

22. In an electric-railway conduit, the combination of an insulator of porcelain or similar vitreous frangible material, and two connecting-pieces, one embedded therein for attachment to the conductor and one embracing and secured to it for attachment to the conduit.

23. An electric-railway conduit consisting of transverse yokes and slot-rails, in combination with a supply-conductor therein, an insulator supported at the side of the conduit below the slot-rail, and an upwardly-extending connection-piece supporting the conductor in the upper part of the conduit above the lower edge of the slot-rail.

24. In an electric-railway conduit, the combination, with an inclosed supply-conductor, of an insulator attached thereto, and a connection between the insulator and the conduit, permitting a movement of the former relative to the latter.

25. In an electric-railway conduit, the combination, with an inclosed supply-conductor, of an insulator therefor attached to the conductor, and a support for the insulator attached firmly thereto, but movable freely relative to the conduit to compensate for expansion and contraction.

26. The combination, with the line conductor supported along an electric railway, of an insulator to which the conductor is attached, and a connection between the insulator and its support, allowing the conductor and insulator a common movement relative to the support.

27. The combination of the conduit, the hanger pivoted thereto, the insulator forming part of said hanger, and the conductor connected to the said insulator.

28. The combination of the conduit, the supply-conductor, and the intermediate swinging support having an insulating portion.

29. In an electric railway, the combination of the conductors having lugs at fixed points thereon, with supports therefor freely engaging said lugs, whereby the conductors may be readily removed.

30. In an electric railway, the combination of the conductor having projecting loops or lugs at fixed points thereon, and adjustable supports having sliding connection with said loops or lugs.

31. The combination of the conductor-section with the loop J, carried thereby, and the supporting-piece I, engaging said loop loosely, substantially as described.

32. In an electric railway, the combination of two conductors supported on suitable insulators adjacent to each other, with a projecting arm extending from one of the conductors, and an expansion-joint connecting this arm with the second conductor.

33. In an electric railway, the combination of two conductors supported adjacent to each other, with the two pieces of conducting material united by an expansion-joint, and suitable fastening devices for attaching the same to the conductor-sections after the latter are in place, substantially as described.

34. The combination of the conductor-sections and the two guide-pieces forming extensions of the conductors and engaging with one another.

35. The combination of two conductors and the spring attached to one conductor and connected to the other, whereby expansion of the conductors is permitted by flexure of the spring.

36. In an electric railway, the combination, with two adjacent sections of conductor, of a flexible connecting-piece composed of a number of superposed metallic strips.

37. In an electric railway, the combination, with adjacent conductor-sections, of an extension-piece on one section and an embracing-piece therefor on the other section, the whole forming an expansion-joint between the sections.

38. The combination, with a supply-conductor of an electric railway, of an expansion-joint comprising a sliding piece movable back and forth relatively to one at least of the conductor-sections and attached by a pivot-joint to the conductor, by which binding of the sliding piece is prevented.

39. A conductor-section for an electric railway, having at one end a piece permanently attached by an expansion-joint and adapted to be connected to the succeeding section.

40. A conductor-section for an electric railway, having at one end a piece permanently attached by an expansion-joint, with a flexible connection around the joint and adapted to be connected to the succeeding section.

41. A line conductor for electric railways, made up of substantially rigid sections, united by a pivot-joint.

42. A line conductor for an electric railway, made up of substantially rigid sections, united by a transverse joint, permitting vertical movement of the sections.

43. The combination of the two conductors and a joining piece extending from one to the other and connected to one by a transverse pivot, whereby slight vertical movement of the conductors relatively to each other is permitted.

44. In a crossing for an electric railway, the combination of the continuous outer conductors shaped to correspond to the angle made by the two lines, with the two inner sets of conductors, each terminating at the crossing-point, the conductors of each set being of opposite polarity and insulated from each other.

45. In a crossing for an electric railway, the combination of the two continuous conductors, the two inner sets of conductors terminating at the crossing, and non-conducting frog-points T T, substantially as described.

46. In an electric railway, the combination of the two parallel tracks and the cross-over with the two conduits placed between the tracks, and the cross-over conduit communicating with the main conduit of one line and extending across to the outside of the opposite line to a point beyond the cross-over-track switch, substantially as described.

47. An electrically-propelled vehicle designed to run upon both tracks of a double-track railway, provided with two oppositely-placed collector attachments, one corresponding to each track, to which, respectively, the active current-collector is connected, according as the vehicle is upon the one or the other of said tracks.

48. In a double-track electric railway, a vehicle provided with two oppositely-placed collector attachments, one for each track, combined with a current-collector connected to the attachment, corresponding to the track on which the vehicle is progressing.

49. An electrically-propelled vehicle designed to run upon both tracks of a double-track electric railway, provided with two current-collector attachments, one upon each side, to which, respectively, the collector-supplying current to the motor is connected, according as the vehicle is upon the one or the other of said tracks.

50. A vehicle provided with two current-collectors connected to opposite sides thereof and adapted to be used alternately to complete the circuit between the supply-conductor and the motor.

51. In an electric railway, a vehicle provided with two movable plows, one on each side of the car, for use when the car is traveling in opposite directions upon a double-track road, and operating mechanism for throwing either plow into and out of operative position independently.

52. The combination of two sections of track, conductors therefor arranged on opposite sides of the same, respectively, with a vehicle adapted to travel on both said sections, and a collector in circuit with the conductor when the vehicle is on either section of track, but attached to the vehicle at points upon opposite sides thereof.

53. The combination of the two tracks, the conduits and inclosed conductors between the two tracks, the vehicle, means for transferring it from one track to the other without reversal, the two collector attachments upon opposite sides of the same, and two independent current-collectors for use upon the tracks, respectively, adapted to be secured to the said attachments.

54. The combination of a vehicle and a propelling-motor, with two current-collectors connected to opposite sides of the vehicle in circuit with one pole of the motor and adapted to be used alternately.

55. In an electric railway, the plow consisting of the shank and a contact-shoe movable relatively to the shank and adapted to contact with the supply-conductor, in combination with the said conductor having a curved extension at its end, adapted to guide the contact-shoe onto the end of the conductor.

56. The plow having a spring-pressed contact-shoe which normally stands at an angle thereto and is movable in a vertical plane, in combination with a supply-conductor having downwardly-curved extensions at breaks corresponding to switches, crossings, and the like for guiding the shoe upon the end of the conductor.

57. The combination of an electrically-propelled vehicle and a transverse guide, with the traveling current-collector support having a bearing at one end upon said guide and movable therealong and having its outer end projecting beyond the guide, and a current-collector attached to the said outer end, substantially as described.

58. The combination of the transverse guide located between the wheels of an electrically-propelled vehicle, and a sliding support having a bearing at one end upon said guide and having its other end projecting beyond the wheel, with a current-collector connected to its outer end, substantially as set forth.

59. In an electric-railway conduit, the combination of a slot-rail, a substructure on which the slot-rail has a sliding connection, a conductor therein expansible independently of said rail, and a porcelain or similar non-combustible insulator for said conductor, attached to said substructure by an embracing connection device.

60. In an electric-railway conduit, the combination of a slot-rail, a transverse yoke on which the rail has a sliding connection, a porcelain or similar non-combustible insulator extending into an opening in the yoke, and a conductor in the conduit, supported by said insulator and expansible independently of the slot-rail.

61. In an electric-railway conduit, the combination, with the substructure, of a slot-rail and conductor, both having an independent sliding connection with the substructure, the latter through a porcelain or similar vitreous insulator having a metallic connecting-piece both between the conductors and the substructure.

62. In an electric railway, the combination, with an inclosing conduit, of the supply-conductor, an insulator therefor, of porcelain or similar material, having an embracing piece, and an intermediate filling of lead or equivalent metallic deadening material.

63. In an electric railway, the combination, with an inclosing conduit, of a supply-conductor, an insulator for said conductor of porcelain or similar material, a metallic embracing piece for the insulator, attached to the conduit, and an intermediate filling of lead or equivalent metallic deadening material.

FRANCIS O. BLACKWELL.

Witnesses:
EDWARD M. BENTLEY,
ROBERT W. BLACKWELL.